(12) United States Patent
Brahmavar

(10) Patent No.: US 9,692,282 B2
(45) Date of Patent: Jun. 27, 2017

(54) METHOD OF FABRICATING ELECTRICAL MACHINE

(71) Applicant: Regal Beloit America, Inc., Beloit, WI (US)

(72) Inventor: Subhash Marutirao Brahmavar, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 658 days.

(21) Appl. No.: 14/013,628

(22) Filed: Aug. 29, 2013

(65) Prior Publication Data

US 2015/0061468 A1    Mar. 5, 2015

(51) Int. Cl.
*H02K 15/03* (2006.01)
*H02K 15/02* (2006.01)

(52) U.S. Cl.
CPC ............. *H02K 15/03* (2013.01); *H02K 15/02* (2013.01); *H02K 2213/03* (2013.01); *H02K 2213/09* (2013.01); *H02K 2213/12* (2013.01); *Y10T 29/49009* (2015.01); *Y10T 29/49012* (2015.01)

(58) Field of Classification Search
CPC .. H02K 15/02; H02K 15/03; Y10T 29/49009; Y10T 29/49012
See application file for complete search history.

(56) References Cited

U.S. PATENT DOCUMENTS

| | | |
|---|---|---|
| 4,350,043 A | 9/1982 | Jones |
| 4,501,984 A | 2/1985 | Mishima |
| 5,097,166 A * | 3/1992 | Mikulic ................. H02K 21/46 310/156.83 |
| 5,203,070 A * | 4/1993 | Montgomery ......... H02K 15/00 29/596 |
| 2002/0035775 A1* | 3/2002 | Uchida .................. H02K 15/03 29/598 |
| 2004/0007930 A1 | 1/2004 | Asai et al. |
| 2007/0096584 A1 | 5/2007 | Erfanfar |
| 2011/0144841 A1 | 6/2011 | Ruben |

FOREIGN PATENT DOCUMENTS

| | | |
|---|---|---|
| EP | 2390511 A1 | 11/2011 |
| EP | 2575243 A2 | 4/2013 |
| WO | 9816319 A1 | 4/1998 |
| WO | 2009145037 A1 | 12/2009 |

* cited by examiner

*Primary Examiner* — Livius R Cazan
(74) *Attorney, Agent, or Firm* — John Wagley

(57) ABSTRACT

A method for fabricating a rotor for an electric motor is provided. The method includes the steps of fabricating a first set of rotor parts for use in a motor having a first frame size and fabricating a second set of rotor parts for use in a motor having a second frame size. The second frame size is substantially different from the first frame size. The method further includes the steps of fabricating a third set of rotor parts for use in the motor having the first frame size and for use in the motor having the second frame size, ascertaining the desired motor frame size, and selecting one of the first set of rotor parts and the second set of rotor parts in accordance with desired motor frame size. The method also includes the steps of selecting the third set of rotor parts and assembling a rotor with one of the first set of rotor parts and the second set of rotor parts and with the third set of rotor parts, such that a rotor for use with the desired motor frame size is substantially provided.

19 Claims, 12 Drawing Sheets

METHOD OF FABRICATING ELECTRICAL MACHINE

BACKGROUND OF THE INVENTION

The embodiments described herein relate generally to an electric machine, and more specifically, to a kit and method associated with motors including brushless motors, both AC and DC, including induction motors and those having radially embedded permanent magnet rotors.

Among the various types of electric machines are permanent magnets. For example, a brushless direct current (BLDC) motor may include a plurality of permanent magnets coupled to an exterior surface of a rotor core. Typically, the permanent magnets are coupled to the exterior surface of the rotor core using an adhesive and/or an outer retaining covering. This coupling between the permanent magnets and the rotor core must resist forces exerted on the permanent magnets during high speed rotation tending to separate the permanent magnets from the motor.

Motors of all types including motors including brush and brushless motors, both AC and DC, including induction motors and motors including brush and brushless motors, both AC and DC, including induction motors and brushless direct current (BLDC) motors including electronically commutated motors (ECM) are manufactured and sold in a large variety of sizes and horsepower. The components of each of these sizes in each of the motor types are different, being engineered and optimized for that particular type and size of motor.

The particular sizes of each motor type have been standardized by various government and industry organizations in several major industrial nations. For example in the United States of America, the National Electrical Manufacturers' Association, NEMA, has standardized motors by various NEMA sizes, including for example NEMA sizes: NEMA 42, NEMA 48 and NEMA 56.

Since each component of each motor size of each motor type is different, each such component must be manufactured in separate lots with separate tooling. Further sub assembly and final assembly of the components of each motor size of each motor type must similarly be assembled in separate lots with separate tooling. The need for the many separate components, tooling and manufacturing lots as well as the need for the associated in process and final inventory of these components and subassemblies increases substantially the costs of all motors.

The present invention is directed to alleviate at least some of these problems with the prior art.

BRIEF DESCRIPTION OF THE INVENTION

In one aspect, a method for fabricating a rotor for an electric motor is provided. The method includes the steps of fabricating a first set of rotor parts for use in a motor having a first frame size and fabricating a second set of rotor parts for use in a motor having a second frame size. The second frame size is substantially different from the first frame size. The method further includes the steps of fabricating a third set of rotor parts for use in the motor having the first frame size and for use in the motor having the second frame size, ascertaining the desired motor frame size, and selecting one of the first set of rotor parts and the second stator in accordance with desired motor frame size. The method also includes the steps of selecting the third set of rotor parts and assembling a rotor with one of the first set of rotor parts and the second set of rotor parts and with the third set of rotor parts, such that a rotor for use with the desired motor frame size is substantially provided.

In another aspect, a method for fabricating a motor is provided. The method includes the steps of fabricating a first set of motor parts for use in a motor having a first frame size and fabricating a second set of motor parts for use in a motor having a second frame size. The second frame size is substantially different from the first frame size. The method also includes the steps of fabricating a third set of motor parts for use in the motor having the first frame size and for use in the motor having the second frame size and the step of ascertaining the desired motor frame size. The method also includes the steps of selecting one of the first set of motor parts and the second set of motor parts in accordance with desired motor frame size, selecting the third set of motor parts, and assembling a motor with one of the first set of motor parts and the second set of motor parts and with the third set of motor parts, such that a motor having the desired motor frame size is substantially provided.

In yet another aspect, a kit for fabricating a plurality of motors is provided. One of the plurality of motors has a first frame size and a second of the plurality of motors has a second frame size. The kit includes a first set of motor parts for use in the motor having the first frame size and a second set of motor parts for use in the motor having the second frame size. The second frame size is substantially different from the first frame size. The kit also includes a third set of motor parts for use in the motor having the first frame size and for use in the motor having the second frame size. The first set of motor parts, the second set of motor parts, and third set of motor parts are configured to provide essentially all the parts required to assemble a motor having the desired motor frame size.

DETAILED DESCRIPTION OF THE INVENTION

The need for the many separate components, tooling and manufacturing lots as well as the need for the associated in process and final inventory of these components and sub-assemblies increases substantially the costs of all motors. The added costs of these many different components and assemblies necessitate a need to reduce these increased costs, while minimizing any design compromises from such efforts. This disclosure provides designs and methods using common components for different sizes for motors while minimizing any design compromises from such efforts.

Technical effects of the methods, systems, and apparatus described herein include at least one of improved performance and quality and reduced labor costs.

Figure 1:
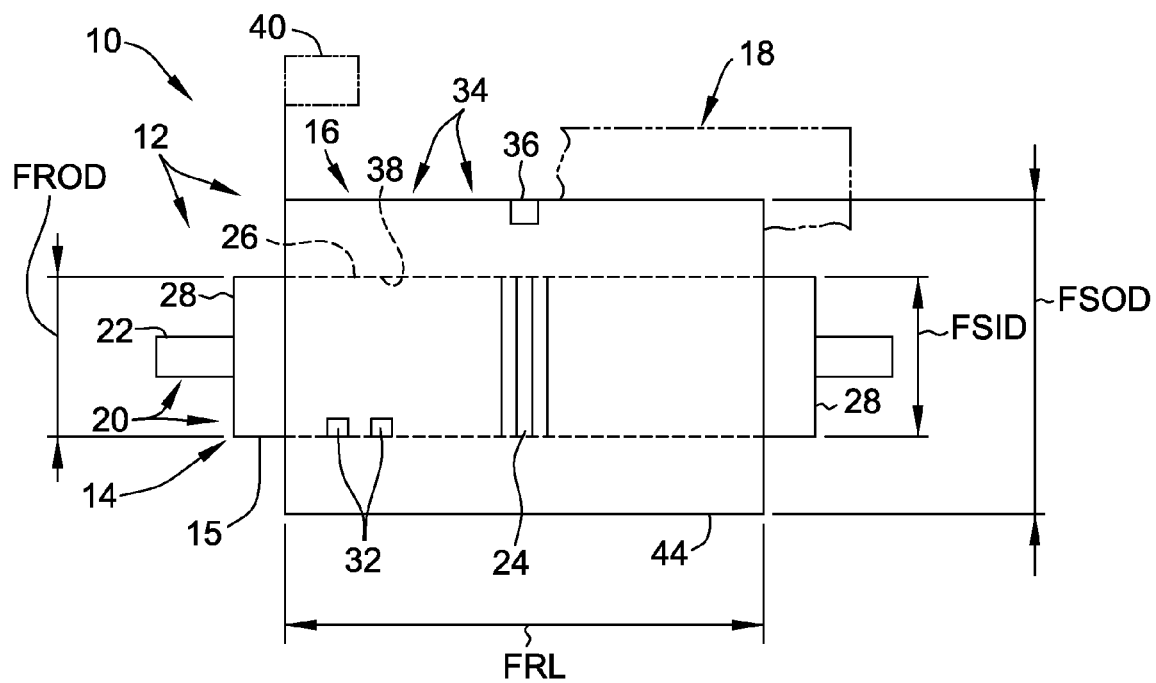
FIG. 1 is a plan view of a motor having a first frame size for use in a motor kit embodying the present invention.

FIG. 1 is a plan view of an exemplary electric machine in the form of first electric motor 10. Note that the benefits of the present invention may accrue to all electric machines including electric motors and electric generators. The motor 10 may be any motor capable of receiving electrical energy and producing mechanical work. The motor 10 may be an induction motor. The motor 10 may be a brushless AC/DC motor. For example, the motor 10 may be an electronically commutated motor (ECM).

The National Electrical Manufacturers Association, hereinafter NEMA, has established industry standards for motor frame sizes so that industrial and consumer motor users can obtain replacement motors from a variety of suppliers with requiring any modifications to the motor. This standard is based on motors with a frame configured for face mounting with a plurality of fasteners that are filled through mounting holes in a base plate parallel to the motor shaft. The standard establishes a distance from the contact surface of the base plate [Height to Shaft Centerline] and other features, including a particular mounting hole pattern and shaft diameter, for example.

For example various standard sizes have been established:

| NEMA Frame Size | Height to Shaft Centerline (inches) |
|---|---|
| 42 | 2⅝ |
| 48 | 3 |
| 56 | 3½ |
| 56H | 3½ |
| 143T | 3½ |
| 145T | 3½ |
| 182 | 4½ |
| 184 | 4½ |
| 182T | 4½ |
| 184T | 4½ |
| 213 | 5¼ |
| 215 | 5¼ |
| 213T | 5¼ |
| 215T | 5¼ |
| 254U | 6¼ |
| 256U | 6¼ |
| 254T | 6¼ |
| 256T | 6¼ |
| 284U | 7 |
| 286U | 7 |
| 284T | 7 |
| 286T | 7 |
| 284TS | 7 |
| 286TS | 7 |
| 324U | 8 |
| 326U | 8 |
| 324T | 8 |
| 326T | 8 |
| 324TS | 8 |
| 326TS | 8 |
| 364U | 9 |
| 365U | 9 |
| 364T | 9 |
| 365T | 9 |
| 364TS | 9 |
| 365TS | 9 |
| 404U | 10 |
| 405U | 10 |
| 404T | 10 |
| 405T | 10 |
| 404TS | 10 |
| 405TS | 10 |
| 444U | 11 |
| 445U | 11 |
| 444T | 11 |
| 445T | 11 |
| 447T | 11 |
| 449T | 11 |
| 444TS | 11 |
| 445TS | 11 |
| 447TS | 11 |
| 449TS | 11 |

At least in the United States, motors are defined as to frame size as a NEMA xxx motor, where xxx is the NEMA Frame Size. For example, a motor in the United States with a Height to Shaft Centerline of 2⅝ inches is classified as a NEMA 42 motor.

While many motors are used in applications where they are mounted to a flat surface with a series of fasteners so as to take advantage of this standard, many others are not. Since so many motors are not so mounted to a flat surface, at least in the United States, even motors that are not mounted to a flat surface are defined as to size as a NEMA xxx motor. For example, motors for use in Heating, Ventilation and Air Conditioning, HVAC, are mounted by a strap or band around the outer periphery of their housing. The size of such motors, rather than being established by the Height to Shaft Centerline, are established by the frame outer diameter of the motor [which is about ½ of the Height to Shaft Centerline).

Hereinafter when a motor is said to possess one of standard NEMA frame sizes, the meaning would be the accepted general motor size diameter of a particular NEMA Frame Size roughly twice the Height to Shaft Centerline dimension), regardless Whether the motor has a flat mounting plate or not.

The motor 10 may have any size and may be a motor of one of the several standard NEMA frame sizes. For example the motor 10 may be a NEMA 42 frame size.

Figure 2:
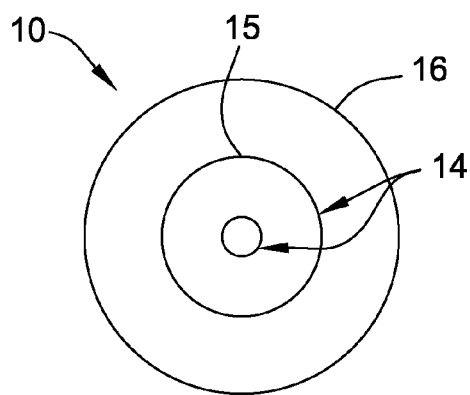
FIG. 2 is an end view of the motor of FIG. 1.

As shown in FIGS. 1 and 2, the motor 10 includes a plurality of motor parts 12. These parts 12 include a rotor assembly 14, including a rotor core 15. The rotor core is commonly referred to simply as a rotor. The rotor assembly rotates about a stator assembly 16, protected at least partially by a machine assembly housing 18.

The rotor assembly 14 includes a plurality of rotor parts 20. The rotor parts 20 may include a shaft 22 and a plurality of laminations 24 which are assembled to form the rotor core or rotor 15. The rotor assembly 14 may define a rotor periphery 26 defining a First Rotor Outer Diameter FROD. The rotor assembly 14 may further define opposed rotor core ends 28 from which the shaft 22 extends. The rotor assembly may also include magnets 32 for creating a rotor magnetic field. The ends 28 define a First Rotor Length FRL.

The stator assembly 16 includes a plurality of stator parts 34 The stator parts 34 may include windings 36 through which an electric current flows to generate an electromagnetic field to cooperate with the rotor magnetic field to provide the rotation of the rotor assembly 14 within the stator assembly 16. The windings 36 may be made of an electrically conductive material including copper or aluminum or a combination thereof. The stator defines an inner periphery 38 defining a First Stator Inner Diameter FSID. The stator assembly 16 further defines a stator outer periphery 44 defining a First Stator Outer Diameter FSOD.

Figure 3:
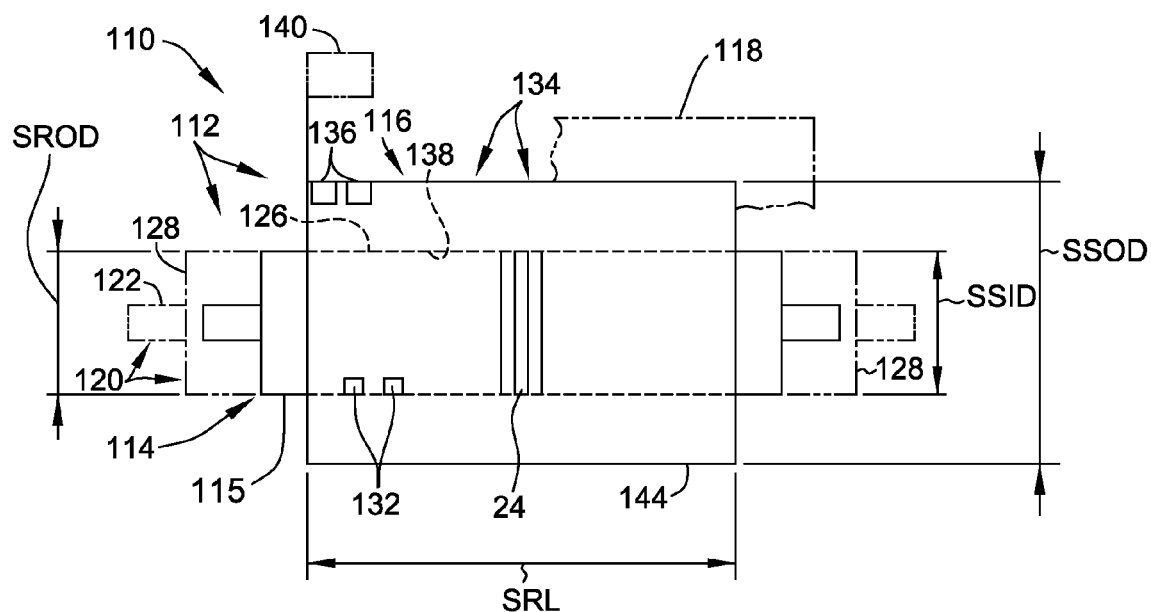
FIG. 3 is a plan view of a motor having a second frame size for use in a motor kit embodying the present invention.
Figure 4:
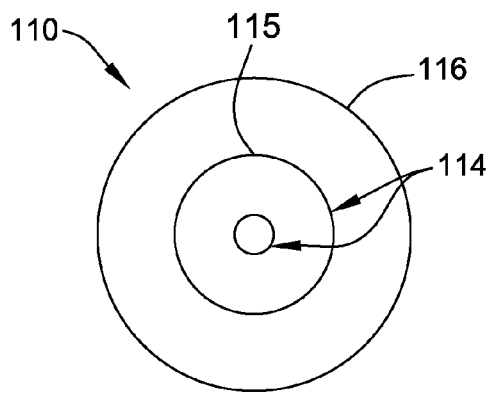
FIG. 4 is an end view of the motor of FIG. 3.

As shown in FIGS. 3 and 4, a second electric motor 110 is shown. The motor 110 may be any motor capable of receiving electrical energy and producing mechanical work. For example the motor 110 may be a brushless AC or a DC motor. The motor 110 may be an induction motor. The motor 110 may be a brushless direct current (BLDC) motor or a brushless AC/DC motor. For example, the motor 110 may be an electronically commutated motor (ECM).

The motor 110 may have any size and may be a motor of one of the several standard NEMA frame sizes. Preferably, the motor 110 has a size different from that of motor 10. For example the motor 110 has a motor frame size, for example, a NEMA motor size different from the NEMA motor size of motor 10. For example the motor 110 may be a NEMA 48 frame size.

The motor 110 includes a plurality of motor parts 112. According to the present invention the motor parts 112 include parts that are different from the parts that are included in the motor parts 12 of the motor 10 of FIGS. 1 and 2 and parts that are the same as those parts that are included in the motor parts 12 of the motor 10 of FIGS. 1 and 2. The parts that are the same are preferably selected to cause a minimal effect on the performance characteristics of the motors 10 and 110, as compared to the performance characteristics of these motor when optimum parts are used to build the motors 10 and 110.

These parts 12 include a rotor assembly 114 which rotates about a stator assembly 116, protected at least partially by a machine assembly housing 118.

The rotor assembly 114 includes a plurality of rotor parts 120. The rotor parts 120 may include a shaft 122 and a plurality of laminations 24. The laminations 24 are assembled to form rotor core or rotor 115. It should be appreciated that any of the plurality of rotor parts 20 of the motor 10 (see FIG. 1 and FIG. 2) and the plurality of rotor parts 120 of the motor 110 may be the same or identical. For example, the lamination 24 assembled to form the rotor core 15 in the rotor assembly 14 of the motor 10 may be the same as the laminations 24 assembled to form the rotor core 115 in the rotor assembly 114 of the motor 110.

The rotor assembly 114 may define a rotor periphery 126 defining a Second Rotor Outer Diameter SROD. The rotor assembly 114 may further define opposed rotor ends 128 from Which the shaft 122 extends. The rotor assembly may also include magnets 132 for creating a rotor magnetic field. The ends 128 define a Second Rotor Length SRL. Since the laminations 24 used in the rotor assembly 114 may be the same as the laminations 24 used in the rotor assembly 14, the First Rotor Outer Diameter PROD and Second Rotor Outer Diameter SROD may then be the same.

Laminations are a particularly effective part in a motor for use as a common part for motors of different size, or, as shown, for motors of different NEMA frame sizes. This is true since rotor assemblies 114 and 14 may be made with a different quantity of laminations, so that the rotor assembly 114 of the larger motor 110 with the NEMA 48 frame may use more laminations than the rotor assembly 114 of the smaller motor 110 with the NEMA 42 frame. The added laminations provide for a Second Rotor Length SRL that is greater than the First Rotor Length FRL. The added laminations 24 may provide the additional magnetic flux required for the larger motor 110, even if the magnets 132 and the magnets 32 are identical. Alternatively, the rotor assembly 110 may use the same number of laminations 24, but the magnets 132 for the rotor assembly 110 may be larger or more powerful magnets than the magnets 32 for the rotor assembly 10 to provide the additional magnetic flux required for the larger motor 110.

The use of a common lamination provides for a common large and complicated part that has multiple usages per motor and that is typically manufactured at great cost and with expensive tooling, for example, a very expensive carbide die for a press used to form the lamination.

Further, since the First Rotor Outer Diameter FROD and Second Rotor Outer Diameter SROD may be the same, the tooling required to assemble the rotor core or rotor 15 to form the rotor assembly 14 may be similar or identical to the tooling required to assemble the rotor core or rotor 115 to form the rotor assembly 114. Further, the tooling required to assemble the rotor assembly 14 in the motor 10 may be similar or identical to the tooling required to assemble the rotor assembly 114 in the motor 110.

The stator assembly 116 includes a plurality of stator parts 134 The stator parts 134 may include windings 136 through which an electric current flows to generate an electromagnetic field to cooperate with the rotor magnetic field to provide the rotation of the rotor assembly 114 within the stator assembly 116. The windings 336 may be made of an electrically conductive material including copper or aluminum or a combination thereof. The stator assembly 116 defines an inner periphery 138 defining a Second Stator Inner Diameter SSID. The stator assembly 116 further defines a stator outer periphery 144 defining a Second Stator Outer Diameter SSOD. Since the First Rotor Outer Diameter FROD and Second Rotor Outer Diameter SROD may be the same and since the rotor assemblies 14 and 114 fit into the stator assemblies 16 and 116, respectively, the First Stator Inner Diameter FSID and the Second Stator inner Diameter SSID may be, likewise, preferably the same.

Further, since the First Stator Inner Diameter FSID and the Second Stator Inner Diameter SSID may be the same, the tooling required to assemble the stator assembly 16 may be similar to the tooling required to assemble the stator assembly 116. Further these common diameters may permit the use of common tooling to assemble the rotor assemblies 14 and 114 into the stator assemblies 16 and 116, respectively.

While the invention may be practiced with any two motors of substantially different frame sizes, it should be appreciated that the use of a common rotor diameter may make the practice of this invention particularly suitable for motors of adjacent frame sizes. For example for 42 and 48 NEMA frame sizes or for 48 and 56 NEMA frame sizes. Other adjacent frame sizes are also anticipated.

The ratio of the First Rotor Outer Diameter FROD (or the Second Rotor Outer Diameter SROD, since it is the same) to the First Stator Outer Diameter FSOD may be preferably from 0.45 to 0.75 inches.

Similarly, the ratio of the First Rotor Outer Diameter FROD (or the Second Rotor Outer Diameter SROD, since it is the same) to the Second Stator Outer Diameter SSOD may be preferably from 0.45 to 0.75 inches.

For example for 42 and 48 NEMA frame sizes the First Stator Outer Diameter FSOD and Second Stator Outer Diameter SSOD may be in the range of 4.7 inches to 5.6 inches.

Referring again to FIGS. 1 and 2, the motor 12 may further include a controller 40 for controlling the timing of and the amount of electrical current entering the windings 36.

Similarly and referring again to FIGS. 3 and 4, the motor 112 may further include a controller 140 for controlling the timing of and the amount of electrical current entering the windings 136.

Figure 5:
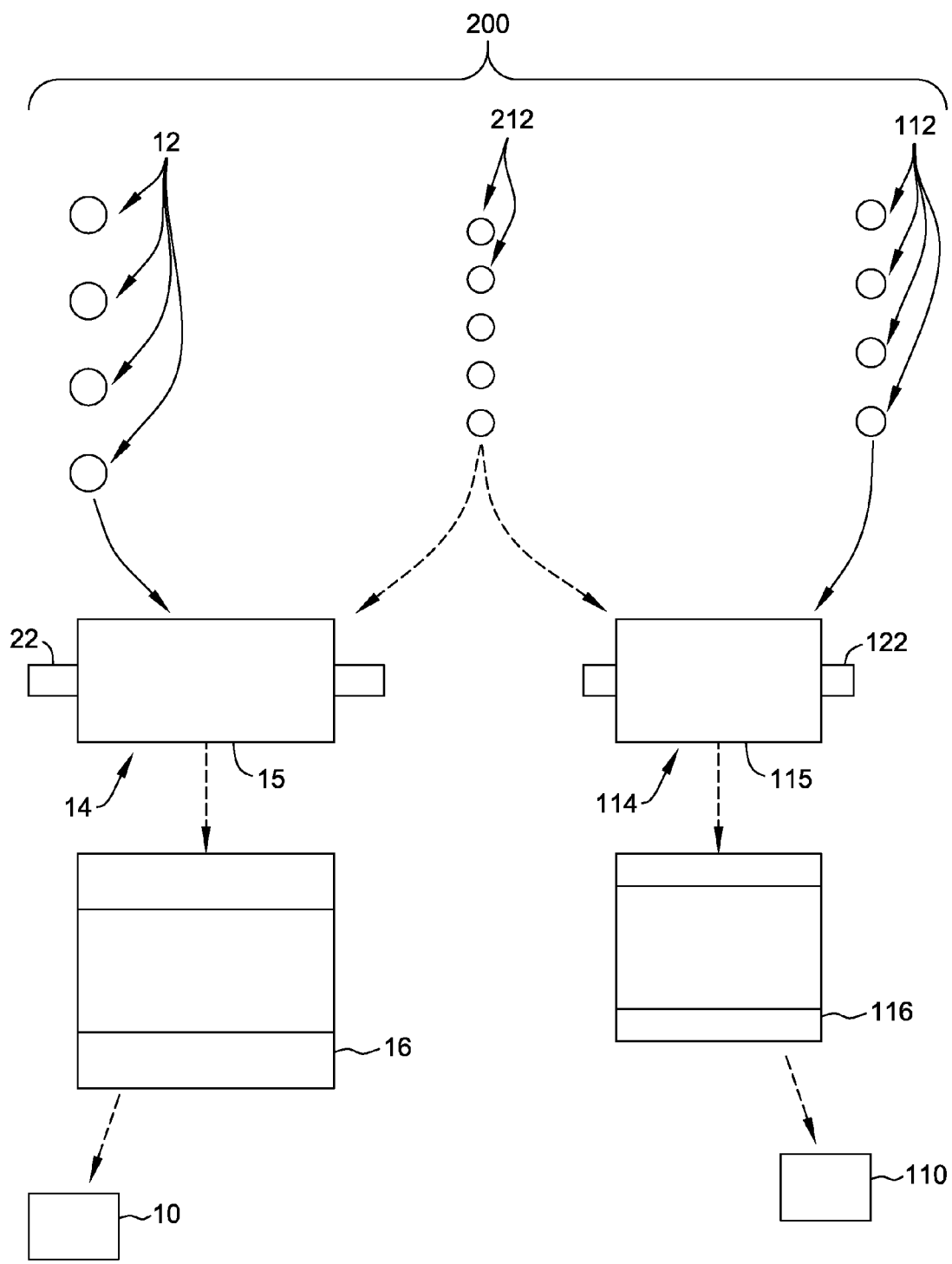
FIG. 5 is a plan view of a kit for a fabricating a motor embodying the present invention.

Referring now to FIG. 5, a kit 200 for fabricating a selected one of at least two motors, for example motor 10 and motor 110 is shown. For example motor 10 has a first frame size, for example is a NEMA frame 42 motor. For example motor 110 has a second frame size, for example is a NEMA frame 48 motor.

The kit 200 includes a first set of motor parts 12 for use in the motor 10 having the first frame size. The kit 200 also includes a second set of motor parts 112 for use in the motor having the second frame size. Note that the second frame size (NEMA 48) is substantially different from the first frame size (NEMA 42.

The kit 200 further includes a third set of motor parts 212 for use in the motor 10 having the first frame size (NEMA 42) and for use in the motor 110 having the second frame size (NEMA 48). For example, rotor laminations 24 may be at least some of the motor parts 212.

Note that the first set of motor parts 12, the second set of motor parts 112, and third set of motor parts 212 are configured to provide essentially all the parts required to assemble a motor having the desired motor frame size.

While the motors 10 and 110 are exemplary for the use of the subject invention, it should be appreciated that the invention is applicable to a wide variety of motors.

The first set of motor parts 12 and the third set of motor parts 212 are used to form rotor assembly 14 and stator assembly 16 which are assembled into motor 10.

Similarly, the second set of motor parts 112 and the third set of motor parts 212 are use assemble rotor assembly 114 and stator assembly 116 which are assembled into motor 110.

Figure 6:
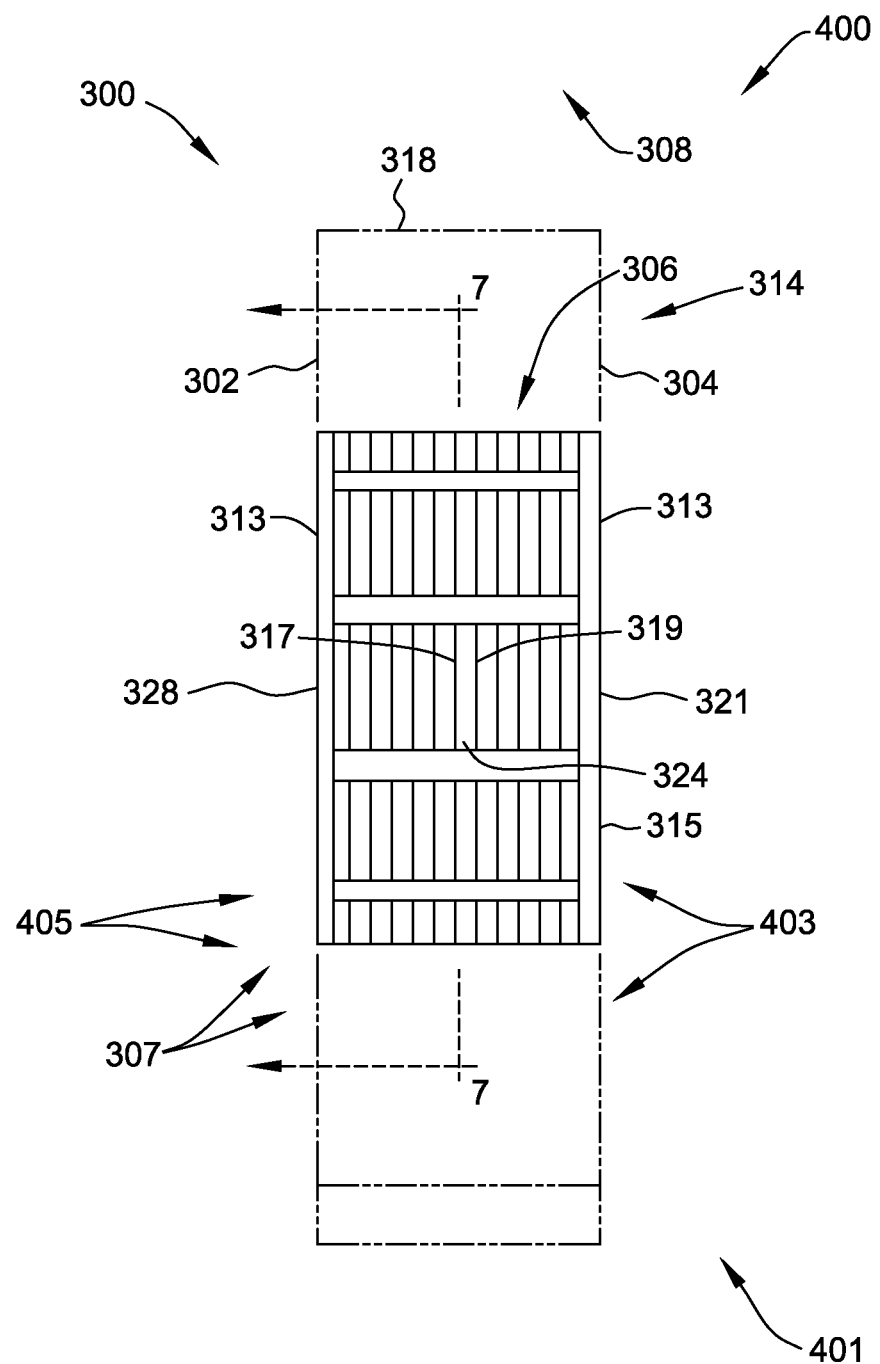
FIG. 6 is an end view of a rotor for use in a motor kit according to an embodiment of the present invention.

For example and referring now to FIG. 6, a partially cut-away end view of a rotatable assembly or rotor assembly 314 of another exemplary electric motor 300 is shown. Although referred to herein as electric motor 300, electric motor 300 can be operated as either a generator or a motor.

Figure 6A:
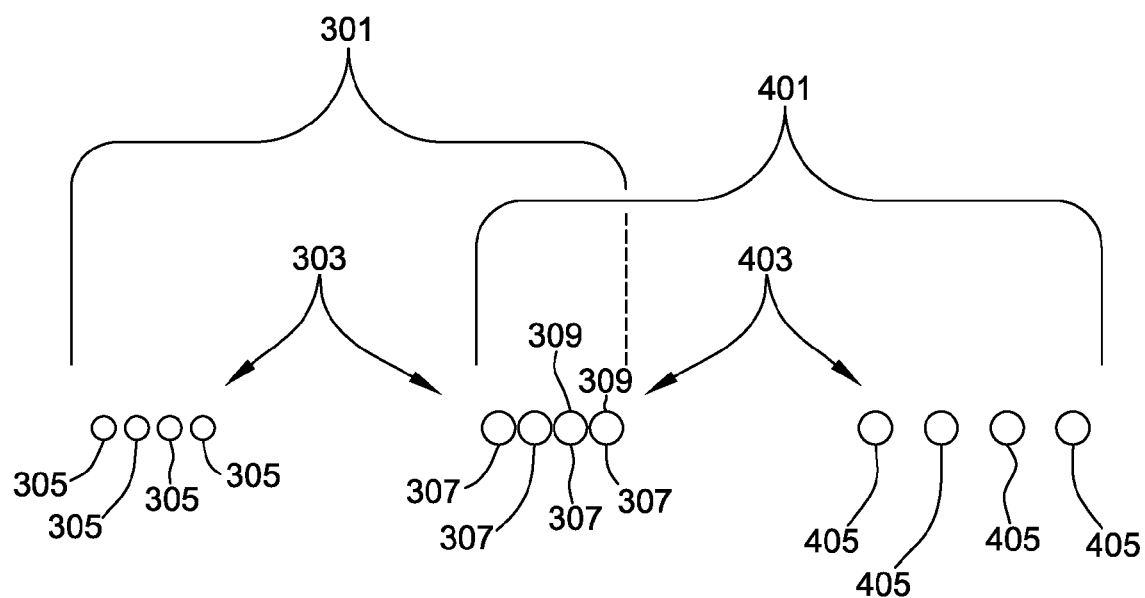
FIG. 6A is a plan view of another kit for a fabricating a motor embodying the present invention.

Referring now to FIG. 6A, electric motor 300 may be made from a kit 301 of first motor parts 303 including first rotor parts 305 and common motor parts 307. The common motor parts 307 may include common rotor parts 309. The electric motor 300 may have be a certain frame size, for example, of a first NEMA frame size, for example the electric motor 300 may be a NEMA 42 frame size.

Figure 8:
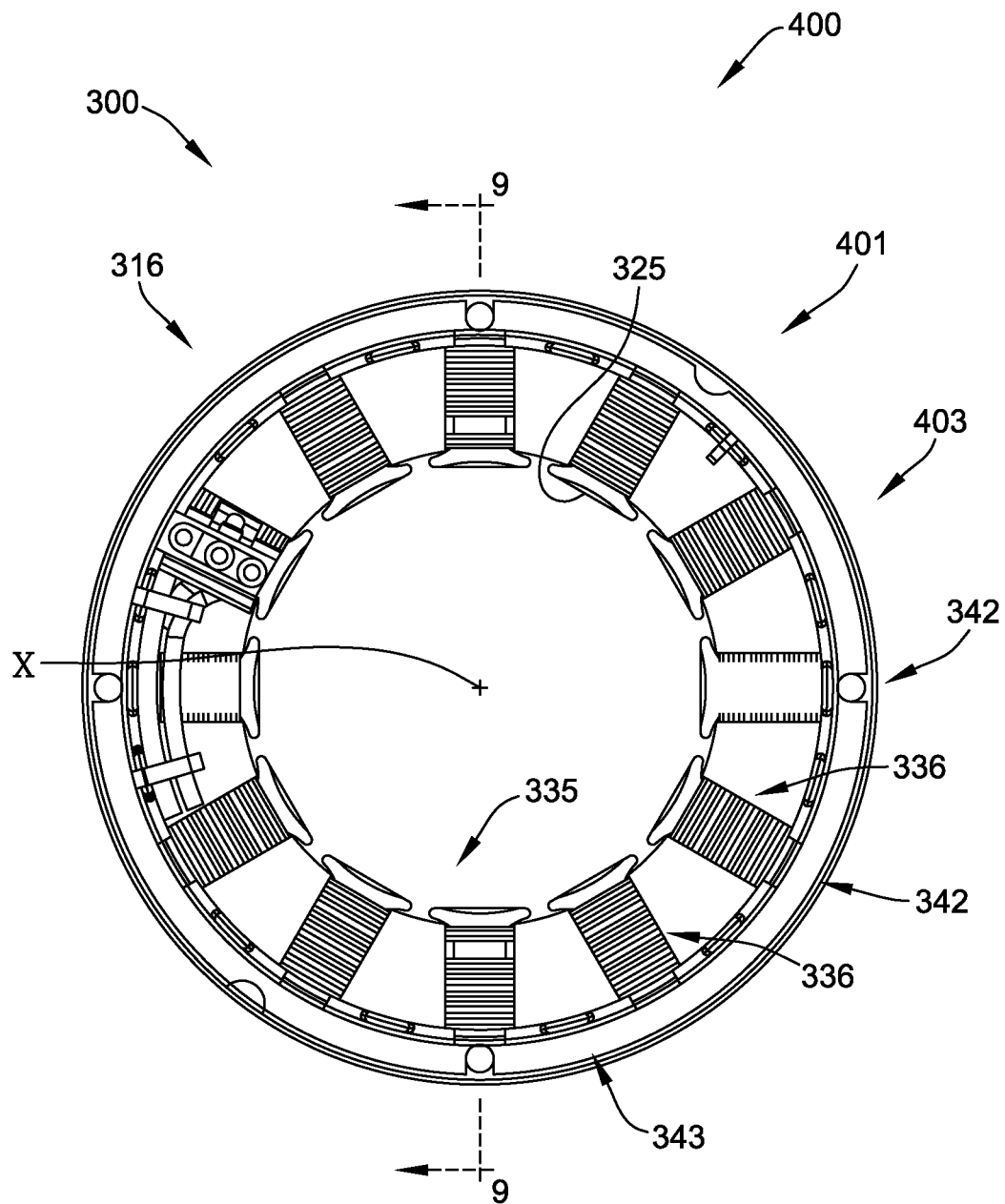
FIG. 8 is an end view of a stator, for use in a motor kit according to an embodiment of the present invention.
Figure 9:
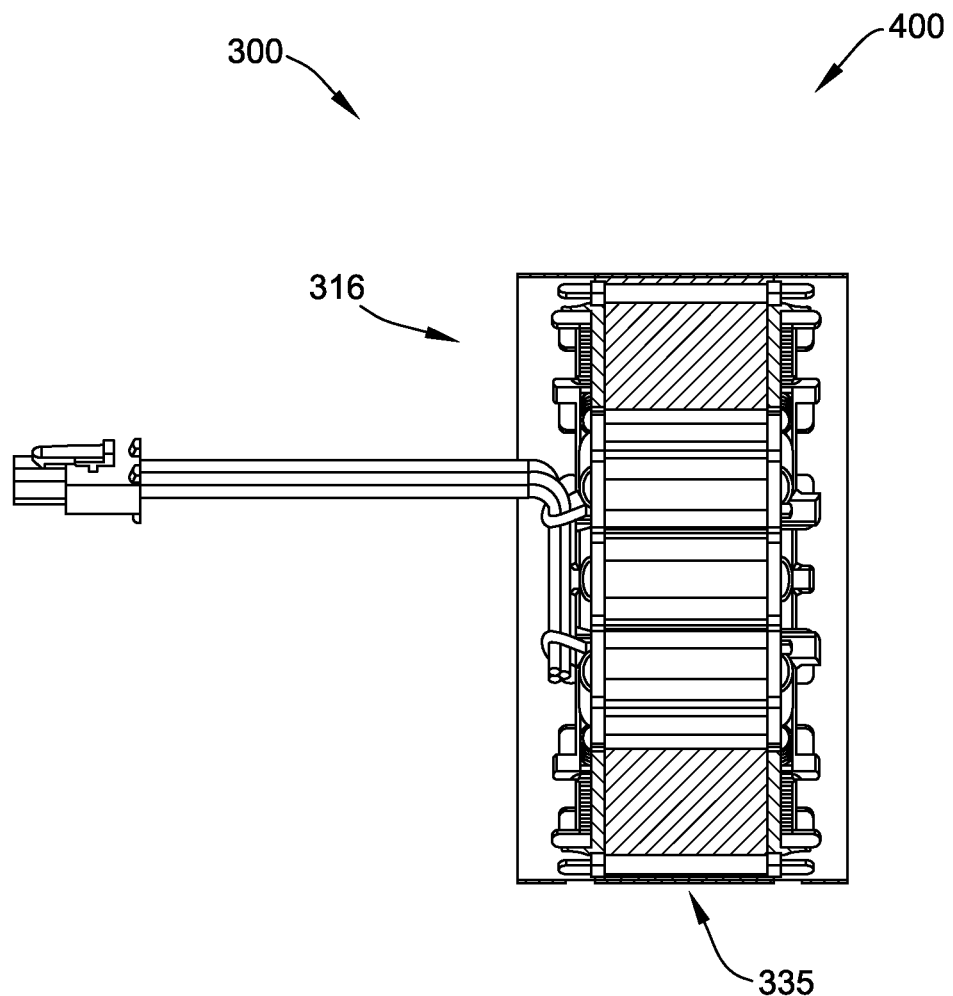
FIG. 9 is a cross sectional view along the line 9-9 in the direction of the arrows of the stator of FIG. 8.

Referring again to FIG. 6, electric motor 300 includes a rotatable assembly 314 including a rotor core or rotor 315 having a first end 302, a second end 304. The rotatable assembly 314 is at least partially enclosed in a motor assembly housing 318. Electric motor 300 also includes a stationary assembly 316 (see FIGS. 8 and 9) and the rotatable assembly 314. Motor assembly housing 318 defines an interior 306 and an exterior 308 of motor 300 and is configured to at least partially enclose and protect stationary assembly 316 and rotatable assembly 314.

Figure 7:
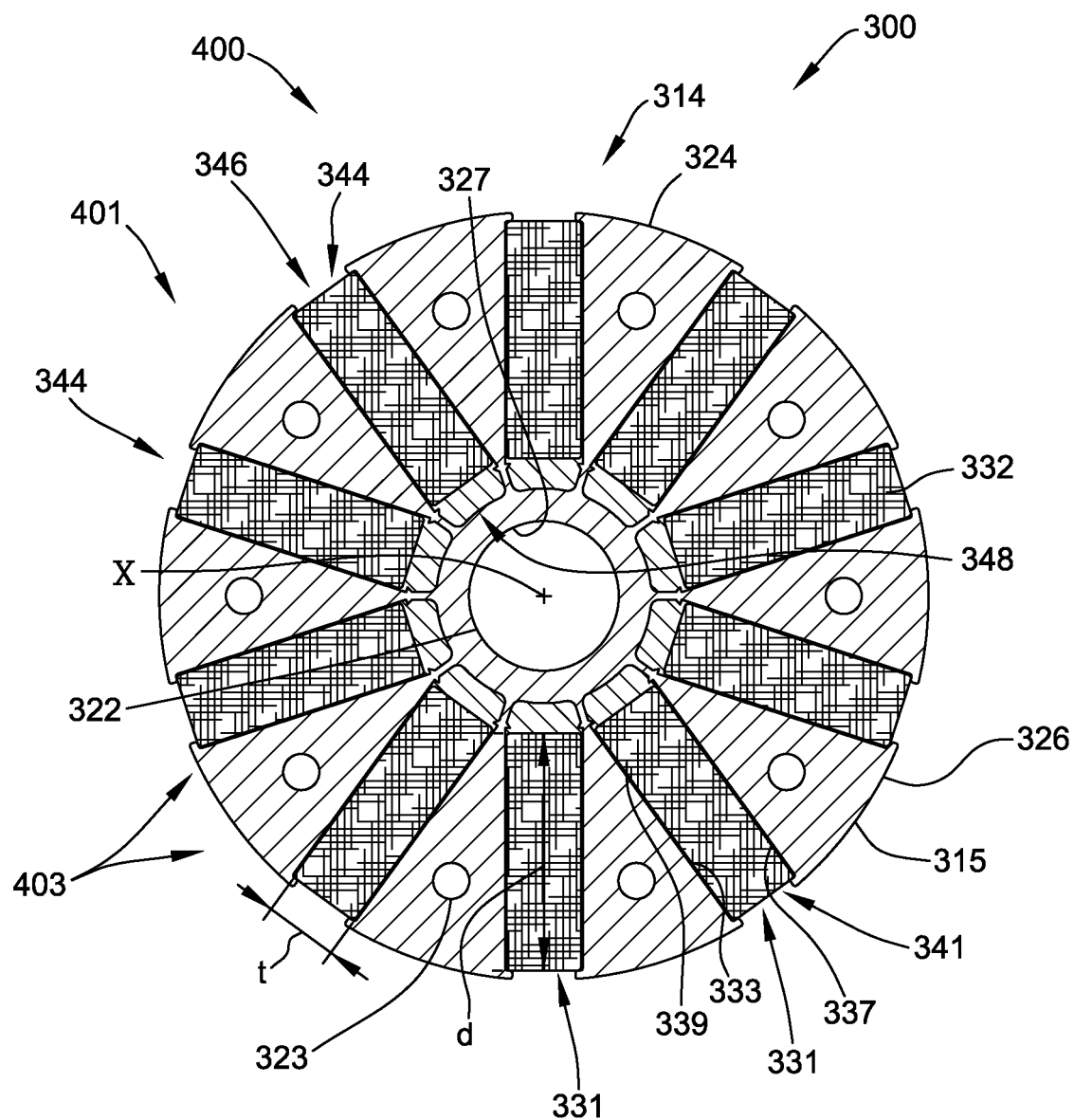
FIG. 7 is a cross sectional view along the line 7-7 in the direction of the arrows of the rotor of FIG. 6.

Referring now to FIG. 7, rotatable assembly 314 includes a permanent magnet rotor core 315 and a shaft 322. In the exemplary embodiment, rotor core 315 is at least partially formed from a stack of laminations 324 made of magnetically permeable material. Alternatively, rotor core 315 is a solid core. Rotor core 315 is substantially received in a central bore 325 of stator core 335 (see FIGS. 8 and 9) for rotation along an axis of rotation X.

The laminations 324 may include a series of apertures 323 in the form of holes for receiving fasteners to secure the laminations 324 together and to add rigidity to the rotor core 315. The apertures 323 may be cylindrical and may be centrally located in the pie shaped portions of the laminations 324.

In the exemplary embodiment of FIG. 7, rotatable assembly 314, also referred to as a radially embedded permanent magnet rotor, includes rotor core 315 and shaft 322. Examples of motors that may include the radially embedded permanent magnet rotors include, but are not limited to, electronically commutated motors (ECM's). ECM's may include, but are not limited to, brushless direct current (BLDC) motors, brushless alternating current (BLAC) motors, and variable reluctance motors. Furthermore, rotatable assembly 314 is driven by an electronic control or controller 340, for example, a sinusoidal or trapezoidal electronic control.

Rotor core 315 is substantially cylindrical and includes an outer edge or periphery 326 and a shaft central opening or bore 325 forming inner periphery 327 having a diameter corresponding to the diameter of shaft 322. Rotor core 315 and shaft 322 are concentric and are configured to rotate about axis of rotation X. In the exemplary embodiment, rotor core 315 includes a plurality of laminations 324 that are either interlocked or loose. For example, laminations 324 may be fabricated from multiple punched layers of stamped metal such as steel. In an alternative embodiment, rotor core 315 is a solid core. For example, rotor core 315 may be fabricated using a sintering process from a soft magnetic composite (SMC) material, a soft magnetic alloy (SMA) material, and/or a powdered ferrite material.

In the exemplary embodiment, rotor core 315 includes a plurality of radial apertures or pockets 331. For example, a first wall 333, a second wall 337 and a third wall 339 define a first radial aperture 341 of the plurality of radial apertures 331. Each radial aperture 331 includes a depth d and thickness t and extends axially through laminations 324 forming rotor core 315 from first end 317 (shown in FIG. 6) to second end 319 (also shown in FIG. 6) of the laminations 324.

Referring again to FIGS. 6 and 7, each radial aperture 331 is configured to receive one or more permanent magnets 332 such that each magnet 332 is radially embedded in rotor core 315 and extends from first end 317 to second end 319 of laminations 324 and at least partially from rotor first end 328 to rotor second end 321. In the exemplary embodiment, permanent magnets 332 are hard ferrite magnets magnetized in a direction tangent to axis of rotation X. However, magnet 332 may be fabricated from any suitable material that enables motor 300 to function as described herein, for example, bonded neodymium, sintered neodymium, and/or samarium cobalt.

To contain the magnets 332 and as shown in FIG. 6, the rotor core 315 may include end laminations 313 on opposed ends of the rotor core 315 that do not include the pockets 331. The end laminations serve to contain the magnets 332 in an axial direction.

In the exemplary embodiment, rotor core 315 includes a plurality of rotor poles 344, each having an outer wall 346 along rotor outer edge 326 and an inner wall 348 (shown in FIG. 7). In the exemplary embodiment, the number of radial apertures 331 is equal to the number of rotor poles 344, and one magnet 332 is positioned within each radial aperture 331 between a pair of rotor poles 344. Although illustrated as including ten rotor poles 344, rotor core 315 may have any number of poles that allows motor 300 to function as described herein, for example, six, eight or ten poles.

In the exemplary embodiment, the design of radially embedded permanent magnet rotor core 315 utilizes lower-cost magnets, yet achieves the power densities and high efficiency of machines using higher-cost magnets, such as neodymium magnets. In the exemplary embodiment, increased efficiency and power density of motor 300 is obtained by increasing the flux produced by rotor core 315. Increased flux generation is facilitated by magnets 332 positioned in radial apertures 331 at depth d, between a minimum magnet depth and a maximum magnet depth. The minimum magnet depth is defined by the equation:

$$D_{min} = \frac{(\pi * R)}{n},$$

wherein $D_{min}$ represents the minimum depth variable, R represents the rotor radius, and n represents the number of rotor poles. The maximum magnet depth is defined by the equation:

$$D_{max} = R - \frac{0.5t}{\tan\left(\frac{180}{n}\right)},$$

wherein $D_{max}$ represents the maximum depth variable, R represents the rotor radius, t represents the magnet thickness in the direction of magnetization, and n represents the number of rotor poles. In the exemplary embodiment, rotor core 315 facilitates increased flux production resulting in optimum efficiency and power density when magnets 332 extend into radial aperture at a depth between $D_{min}$ and $D_{max}$.

While FIGS. 6 and 7 illustrates a three phase electric motor, the methods and apparatus described herein may be included within motors having any number of phases, including single phase and multiple phase electric motors.

Referring again to FIGS. 8 and 9, stationary assembly 316 includes stator core 335, which includes a plurality of teeth 342 and a plurality of windings 336 wound around stator teeth 342. A void or slot 343 is defined by adjacent teeth 342. In the exemplary embodiment, stator core 335 is a twelve tooth stator structure. Alternatively, stator core 335 may include any number of teeth that enables motor 300 to function as described herein, for example, stator core 335 may have nine teeth.

Furthermore, in an exemplary embodiment, stationary assembly 316 is a three-phase salient pole stator assembly and stator core 335 is formed from a stack of laminations made of highly magnetically permeable material. Alternatively, stationary assembly 316 is a single phase salient pole stator assembly. Stationary assembly 316 may be a round, segmented, or roll-up type stator construction and windings 336 are wound on stator core 335 in any suitable manner that enables motor 300 to function as described herein. For example, windings 336 may be concentrated type or overlapped type windings.

It should be appreciated that the number of rotor poles and the number of stator teeth may be optimally selected from a variety of options. For example, the number of rotor poles may, for example, be six, eight, or ten poles. For example, the number of stator teeth may, for example, be nine, or twelve.

In the exemplary embodiment, electric motor 300 is coupled to a fan or centrifugal blower (not shown) for moving air through an air handling system, for blowing air over cooling coils, and/or for driving a compressor within an air conditioning/refrigeration system. More specifically, motor 300 may be used in air moving applications used in the heating, ventilation, and air conditioning (HVAC) industry, for example, in residential applications using ⅕ horsepower (hp) to 1 hp motors. Alternatively, motor 300 may be used in fluid pumping applications. Motor 300 may also be used in commercial and industrial applications and/or hermetic compressor motors used in air conditioning applications, where motor 300 may have a rating of greater than 1 hp. Although described herein in the context of an air handling system, electric motor 300 may engage any suitable work component and be configured to drive such a work component.

Referring again to FIGS. 6, 7, 8 and 9, another electric motor 400 is shown. Although referred to herein as second electric motor 400, second electric motor 400 can be operated as either a generator or a motor.

Referring again to FIG. 6A, electric motor 400 may be made from a second kit 401 of second motor parts 403 including second rotor parts 405 and common motor parts 307. Similarly, the electric motor 300 may be made from a first kit 301 of first motor parts 303 including first rotor parts 305 and common motor parts 307. The common motor parts 307 may include common rotor parts 309.

The electric motor 400 may have be a certain frame size; for example, of a second NEMA frame size, different from the frame size of the electric motor 300. For example the electric motor 400 may be a NEMA 48 frame size. The motor 400 is similar to motor 300 and may have some or all the features of the motor 300 of FIGS. 6-9.

Similar to the kit of FIG. 4, the kits 301 and 401 are used to provide one of a selected plurality of motors, for example, motors 300 and 400. For example, first motor 300 is provided by selecting first motor parts 303 and common motor parts 307 and second motor 400 is provided by selecting second motor parts 403 and common motor parts 307. It should be appreciated that common motor parts 307 may include common rotor parts 309. For example the common rotor parts may be laminations 324.

Figure 10:
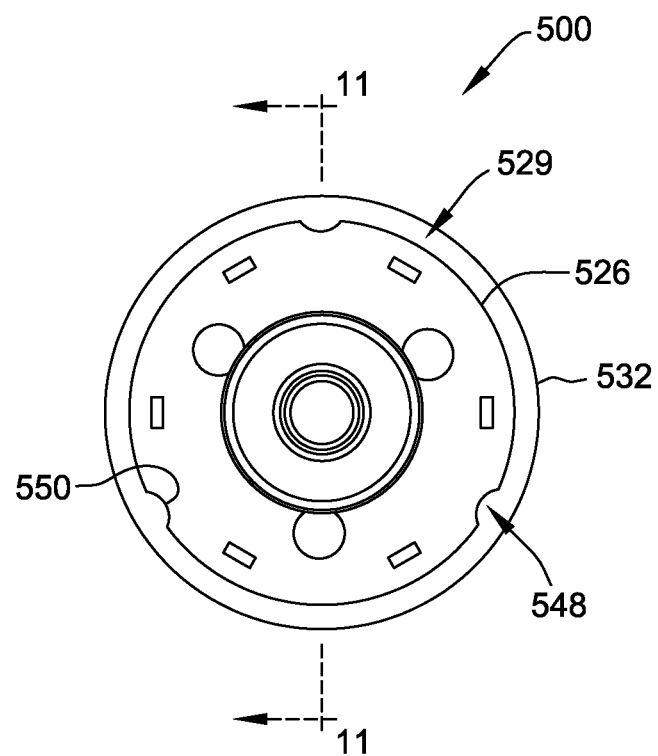
FIG. 10 is an end view of a rotor assembly with shaft and bearing for use in a motor kit according to another embodiment of the present invention.
Figure 11:
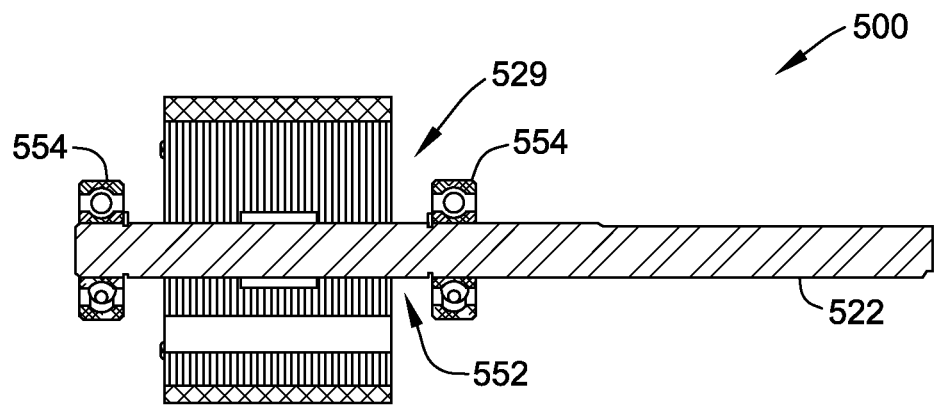
FIG. 11 is a cross sectional view along the line 11-11 in the direction of the arrows of the rotor of FIG. 10.

Referring now to FIGS. 10 and 11, another exemplary embodiment of an electric motor 500 that may be used in the present invention is shown. As shown in FIG. 10, a rotor core 529 may be included within electric motor 500. In the exemplary embodiment, rotor core 529 includes rotor periphery 526 configured to receive a bonded neodymium permanent magnet ring 532. In the exemplary embodiment, rotor periphery 526 defines semicircular depressions 548. The permanent magnet ring 532 includes internally extending semicircular protrusions 550 that mate with the depressions 548. The rotor core 529 includes laminations 524 which define a central opening 552 through which a shaft 522 supported by bearings 554.

Figure 12:
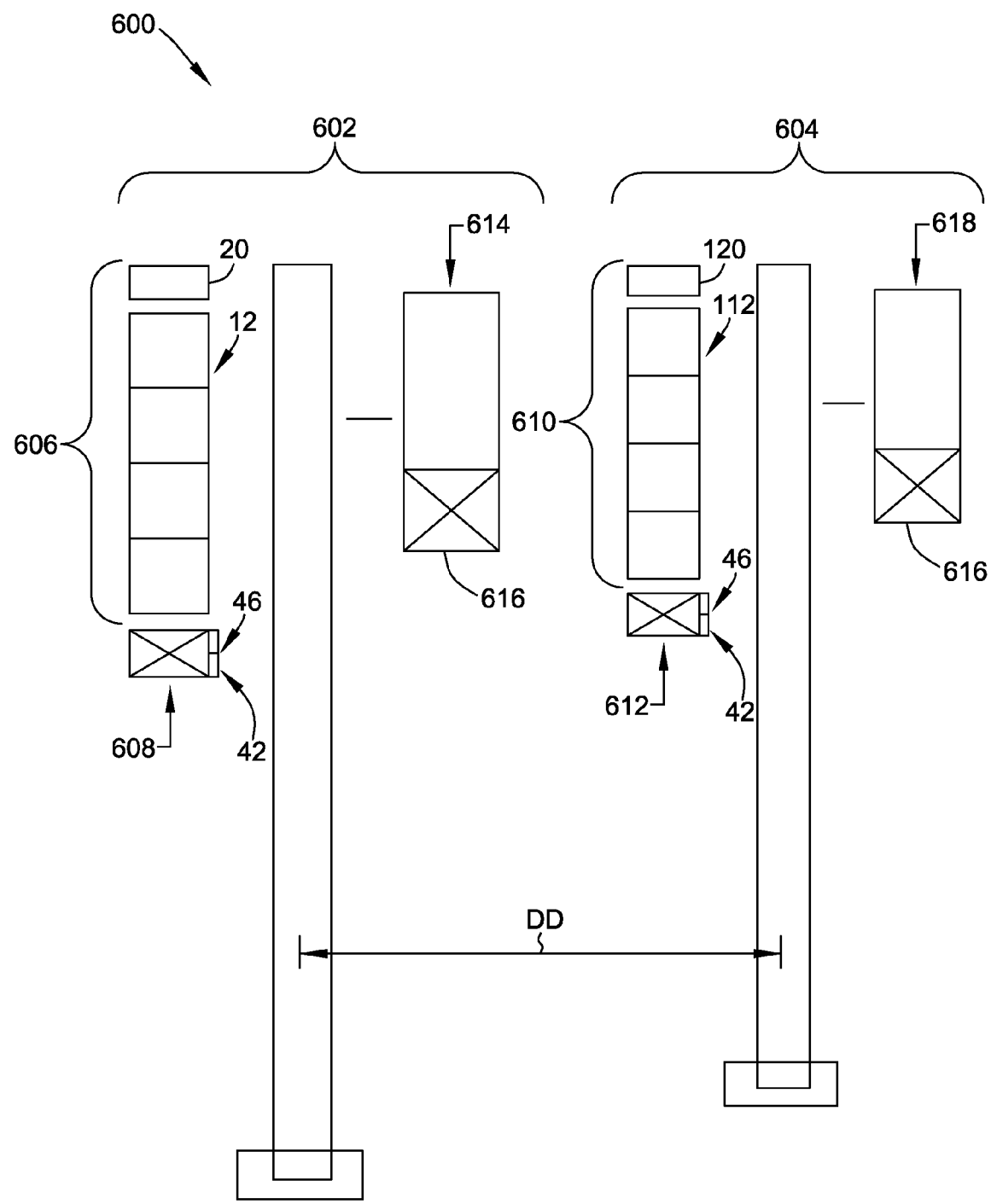
FIG. 12 is a top view of a manufacturing facility for a fabricating a motor embodying the present invention.

Referring now to FIG. 12, a manufacturing facility 600 for fabricating motors embodying the present invention is shown. The facility 600 may include a first assembly line 602 for assembling a first motor 10 (see FIGS. 1 and 2). The layout 600 may include a second assembly line 604 for assembling a second motor 110 (see FIGS. 3 and 4).

The first assembly line 602 includes a first staging area 606 for storing first motor parts 12 (see FIGS. 1 and 2)

including first rotor parts 20 (see FIGS. 1 and 2) for assembly into the first motor 10 (see FIGS. 1 and 2). The first assembly line 602 may further include a second staging area 608 for storing common motor parts 42 (see FIGS. 1 and 2) including common rotor parts 46 (see FIGS. 1 and 2) for assembly into the first motor 10 (see FIGS. 1 and 2).

The second assembly line 604 includes a third staging area 610 for storing second motor parts 112 (see FIGS. 3 and 4) including second rotor parts 120 (see FIGS. 3 and 4) for assembly into the second motor 110 (see FIGS. 3 and 4). The second assembly line 602 may further include a fourth staging area 612 for storing common motor parts 142 (see FIGS. 3 and 4) including common rotor parts 146 (see FIGS. 1 and 2) for assembly into the second motor 110 (see FIGS. 3 and 4).

The first assembly line 602 may further include first unique tooling 614 for use in assembling the first motor parts 12 (see FIGS. 1 and 2) including first rotor parts 20 (see FIGS. 1 and 2) for assembly into the first motor 10 (see FIGS. 1 and 2). The first assembly line 602 may further first common tooling 616 for use in assembling the first motor parts 12 (see FIGS. 1 and 2) including common motor parts 42 (see FIGS. 1 and 2) and/or common rotor parts 46 (see FIGS. 1 and 2).

The second assembly line 602 may further include second unique tooling 618 for use in assembling the second motor parts 112 (see FIGS. 3 and 4) including second rotor parts 120 (see FIGS. 1 and 2) for assembly into the second motor 110 (see FIGS. 3 and 4). The second assembly line 604 may further utilize the first common tooling 616 for use in assembling the second motor parts 12 (see FIGS. 3 and 4) including common motor parts 42 (see FIGS. 1 and 2) and/or common rotor parts 46 (see FIGS. 1 and 2). It should be appreciated that the first assembly line 602 and the second assembly line 604 may be coincident or may be spaced apart a distance DD such that the common tooling 616 and the common Motor parts 142 are readily available for both the first assembly line 602 and the second assembly line 604. It should be appreciated that the common rotor parts 46 (see FIGS. 1 and 2) may be laminations 24 (see FIGS. 1 and 2).

Figure 13:
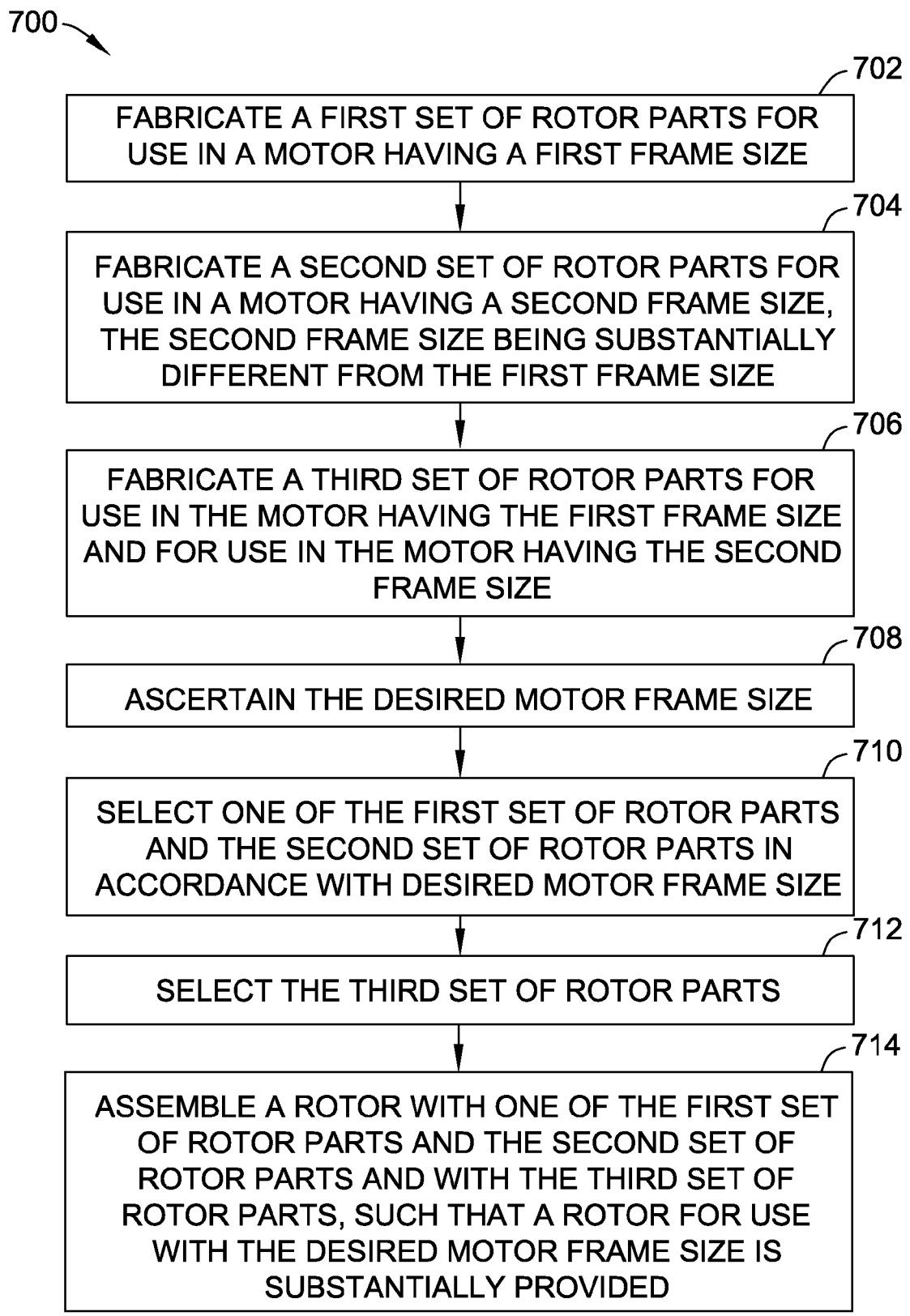
FIG. 13 is a flow chart of a method for fabricating a rotor embodying the present invention.

Referring now to FIG. 13, a flow chart of an exemplary method 700 for fabricating a rotor 14 (see FIGS. 1 and 2), also known as a rotor assembly, for an electric motor 10 (see FIGS. 1 and 2) is shown. The method 700 includes the step 702 of fabricating a first set of rotor parts 20 (see FIGS. 1 and 2) for use in a motor 10 (see FIGS. 1 and 2) having a first frame size.

The method 700 further includes the step 704 of fabricating a second set of rotor parts 120 (see FIGS. 3 and 4) for use in a motor 110 (see FIGS. 3 and 4) having a second frame size. The second frame size is substantially different from the first frame size. The method 700 further includes the step 706 of fabricating a third set of rotor parts 220 (see FIG. 5) for use in the motor 10 (see FIGS. 1 and 2) having the first frame size and for use in the motor 110 (see FIGS. 3 and 4) having the second frame size.

The method 700 further includes the step 708 of ascertaining the desired motor frame size and the step 710 of selecting one of the first set of rotor parts 20 (see FIGS. 1 and 2) one of the first stator 16 (see FIGS. 1 and 2) and the second stator 116 (see FIGS. 3 and 4) in accordance with desired motor frame size.

The method 700 further includes the step 712 of selecting the third set of rotor parts 220 (see FIG. 5) and the step 714 of assembling a rotor with one of the first set of rotor parts and the second set of rotor parts and with the third set of rotor parts, such that a rotor for use with the desired motor frame size is substantially provided.

Figure 14:
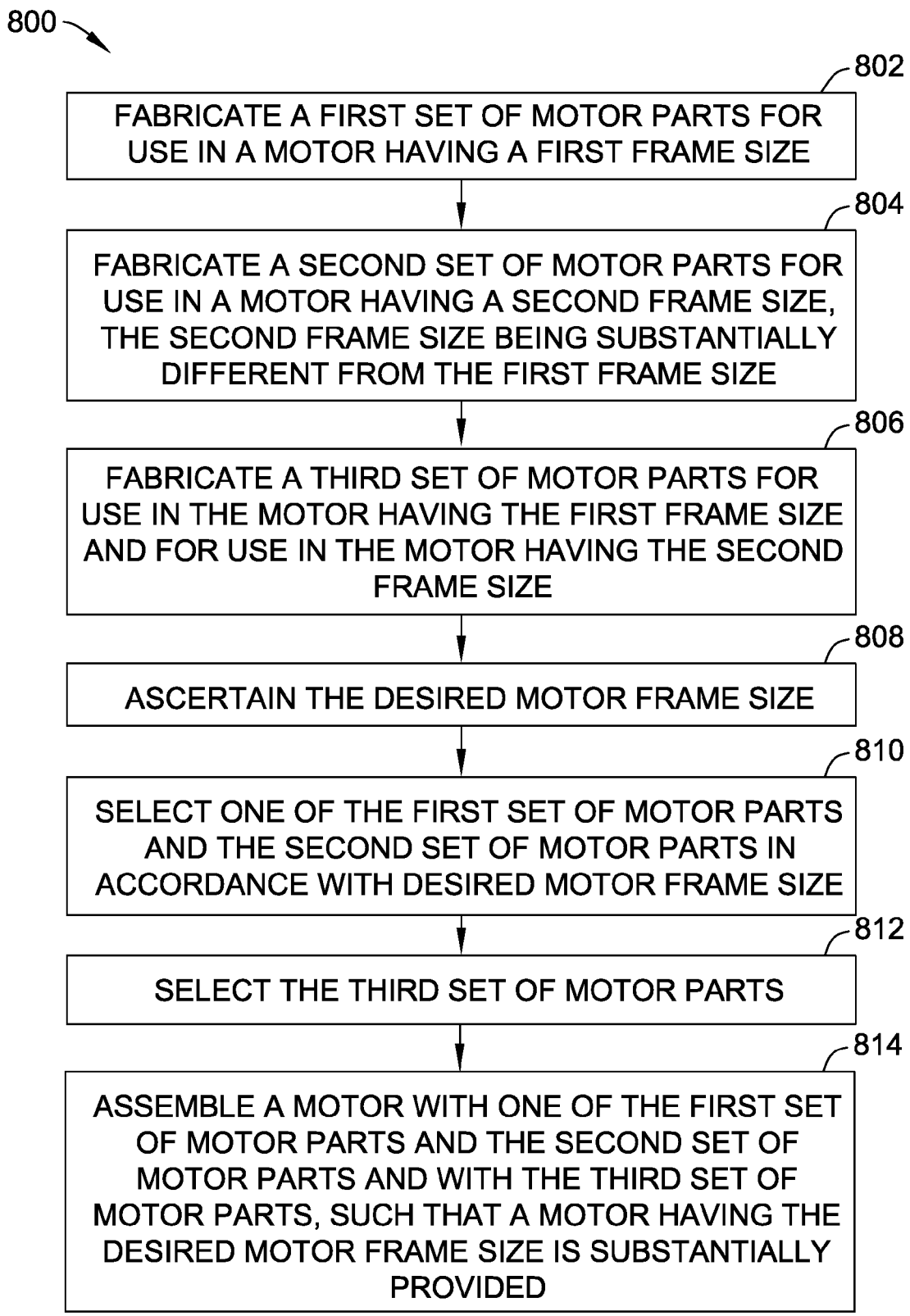
FIG. 14 is a flow chart of a method for fabricating a motor embodying the present invention.

Referring now to FIG. 14, a flow chart of an exemplary method 800 for fabricating a motor 10 (see FIGS. 1 and 2) is shown. The method includes the step 802 of fabricating a first set of motor parts 12 (see FIGS. 1 and 2) for use in a motor 10 (see FIGS. 1 and 2) having a first frame size and the step 804 of fabricating a second set of motor parts 112 (see FIGS. 3 and 4) for use in a motor 110 (see FIGS. 3 and 4) having a second frame size. The second frame size is substantially different from the first frame size. The method 800 further includes the step 806 of fabricating a third set of motor parts 210 (see FIG. 5) for use in the motor 10 (see FIGS. 1 and 2) having the first frame size and for use in the motor 110 (see FIGS. 3 and 4) having the second frame size. The method 800 further includes the step 808 of ascertaining the desired motor frame size and the step 810 of selecting one of the first set of motor parts 12 (see FIGS. 1 and 2) and the second set of motor parts 112 (see FIGS. 3 and 4) in accordance with desired motor frame size. The method 800 further includes the step 812 of selecting the third set of motor parts 210 (see FIG. 5) and the step 814 of assembling a motor with one of the first set of motor parts 12 (see FIGS. 1 and 2) and the second set of motor parts 112 (see FIGS. 3 and 4) and with the third set of motor parts 210 (see FIG. 5), such that a motor having the desired motor frame size is substantially provided.

The methods, systems, and apparatus described herein facilitate efficient and economical assembly of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for fabricating a motor, said method comprising the steps of:
    fabricating a first set of motor parts for use in a motor having a first frame size, the first set of motor parts including a plurality of first stator laminations;
    fabricating a second set of motor parts for use in a motor having a second frame size, the second frame size being substantially different from the first frame size, the second set of motor parts including a plurality of second stator laminations, each of the second stator laminations being substantially larger than each of the first stator laminations;

fabricating a third set of motor parts for use in the motor having the first frame size and for use in the motor having the second frame size, the third set of motor parts including a plurality of rotor laminations;

ascertaining the desired motor frame size;

selecting one of the first set of motor parts and the second set of motor parts in accordance with desired motor frame size;

selecting the third set of motor parts; and assembling a motor with one of the first set of motor parts and the second set of motor parts and with the third set of motor parts, such that a motor having the desired motor frame size is substantially provided.

2. A method in accordance with claim 1, wherein the first set of motor parts includes a plurality of first permanent magnets and wherein the second set of motor parts includes a plurality of second permanent magnets, the first permanent magnets and the second permanent magnets having substantially different magnetic strengths from one another.

3. A method in accordance with claim 2, wherein at least one of the first permanent magnets comprises ferrite and wherein at least one of the second permanent magnets comprises neodymium.

4. A method in accordance with claim 2, wherein at least one of the second permanent magnets comprises neodymium.

5. A method in accordance with claim 2, wherein the plurality of second permanent magnets comprises a neodymium bonded ring.

6. A method in accordance with claim 2, wherein at least one of the first permanent magnets and the second permanent magnets is imbedded into the rotor.

7. A method in accordance with claim 1, wherein the first frame size and the second frame size comprise NEMA frame sizes.

8. A method in accordance with claim 7 wherein:
the first frame size is a NEMA 42 frame size; and
the second frame size is a NEMA 48 frame size.

9. A method in accordance with claim 1:
wherein said first set of motor parts comprises a first stator;
wherein said second set of motor parts comprises a second stator; and
wherein at least one of the first stator and the second stator comprises an internal periphery defining one of 9 or 12 slots.

10. A method in accordance with claim 1, wherein the first set of motor parts includes a first number of rotor laminations and wherein the second set of motor parts includes a second number of rotor laminations, the first number of rotor laminations and the second number of rotor laminations being different from one another.

11. A method in accordance with claim 1:
wherein a set formed by one of said first set of motor parts and said second set of motor parts and the third set of motor parts comprises a rotor; and
wherein the rotor comprises a permanent magnet rotor defining a plurality of magnetic poles.

12. A method in accordance with claim 11, wherein the plurality of magnetic poles comprise one of 6, 8 or 10 poles.

13. A method in accordance with claim 1:
wherein a set formed by the first set of motor parts and the third set of motor parts comprises a first rotor;
wherein the first rotor defines an outer periphery thereof defining a first rotor outer diameter;
wherein said first set of motor parts comprises a first stator;
wherein the first stator defines an outer periphery thereof defining a first stator outer diameter; and
wherein the ratio of the first rotor outer diameter to the first stator outer diameter is in the range of 0.45 to 0.75.

14. A method in accordance with claim 13:
wherein said second set of motor parts comprises a second stator; and
wherein the second stator defines an outer periphery thereof defining a second stator outer diameter; and
wherein the ratio of the first rotor outer diameter to the second stator outer diameter is in the range of 0.45 to 0.75.

15. A method in accordance with claim 1, wherein the motor comprises a brushless direct current motor.

16. A method in accordance with claim 1:
wherein the first set of motor parts and the third set of motor parts are configured to provide a first rotor for use to provide a motor with the first frame size;
wherein the first rotor defines an outer periphery thereof defining a first rotor outer diameter;
wherein said second set of motor parts and the third set of motor parts are configured to provide a second rotor for use to provide a motor with the second frame size;
wherein the second rotor defines an outer periphery thereof defining a second rotor diameter; and
wherein the first rotor diameter and the second rotor diameter are substantially the same.

17. A method in accordance with claim 1, wherein the motor further comprises a motor drive.

18. A method in accordance with claim 17, wherein the motor drive comprises a trapezoidal drive.

19. A method in accordance with claim 17, wherein the motor drive comprises a sinusoidal drive.

\* \* \* \* \*